Patented Apr. 11, 1939

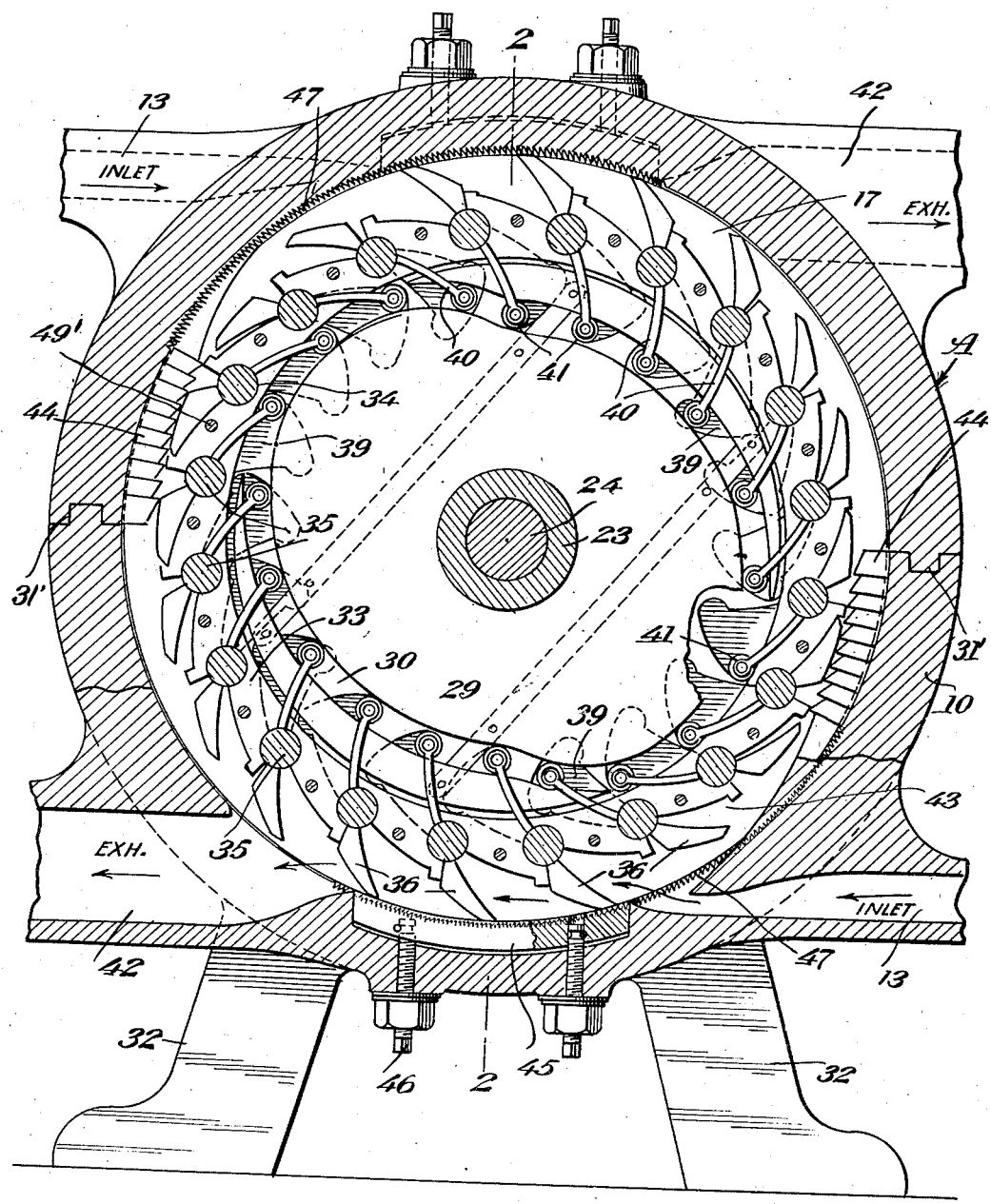

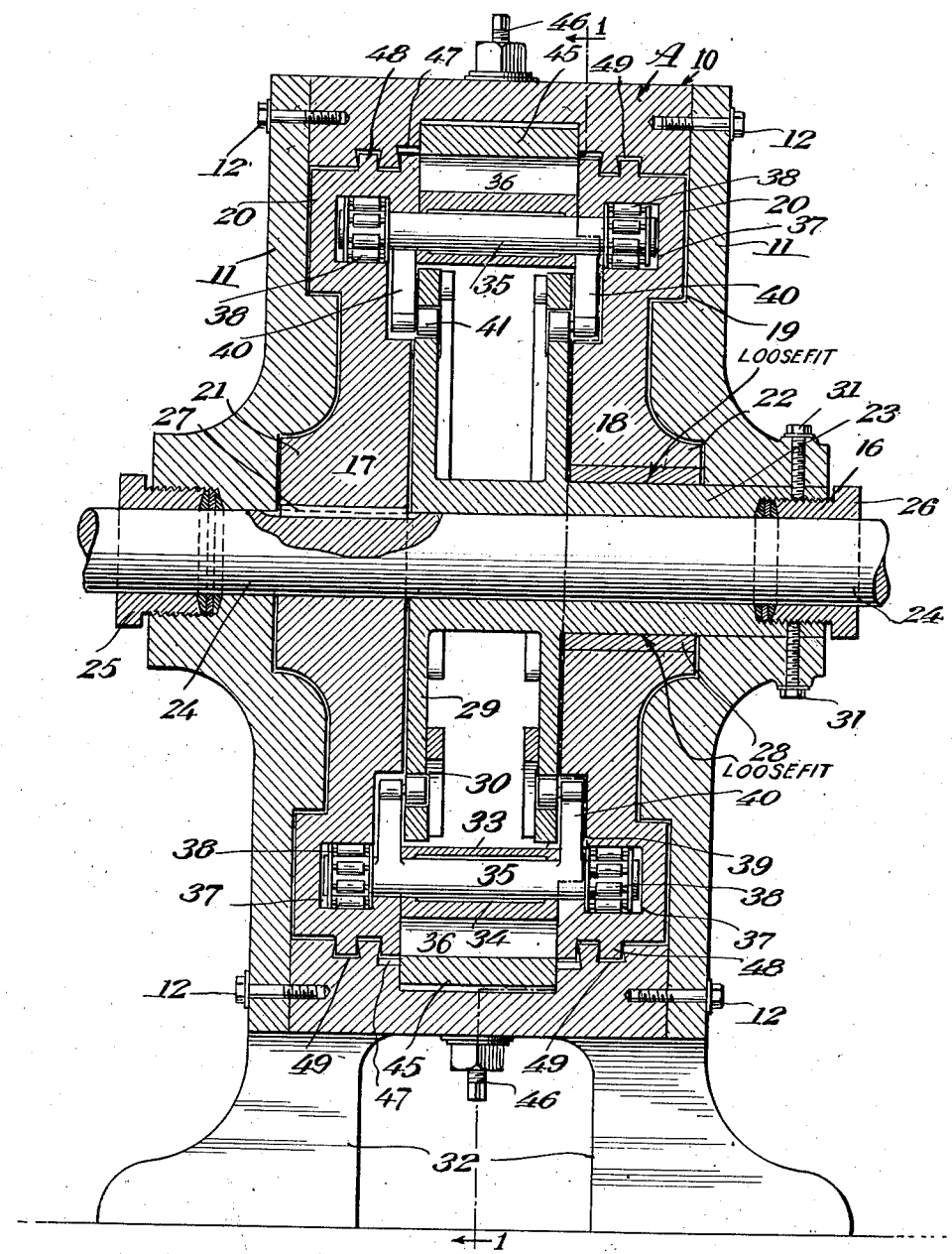

2,153,587

UNITED STATES PATENT OFFICE 2,153,587

FLUID OPERATED MOTOR

Floriano Parreira, Guarulhos, Brazil

Application January 30, 1937, Serial No. 123,302

3 Claims. (Cl. 121—93)

The invention relates to a motor and more especially to a fluid operated motor.

The primary object of the invention is the provision of a motor of this character, wherein a rotor of novel construction is arranged with peripheral blades or vanes, these being pivotally supported and cam controlled in a unique manner so that fluid through pressure will drive the rotor for power purposes.

Another object of the invention is the provision of a motor of this character, wherein the construction in its entirety is novel and is sensitive of operation, being driven by fluid under pressure the rotor blades or vanes being arranged for the automatic action of the same for the full force and effect of the fluid for power purposes.

A further object of the invention is the provision of a motor of this character, which is comparatively simple in construction, thoroughly reliable and effective in its operation, assuring maximum driving power, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a sectional view through the motor constructed in accordance with the invention and taken on the line 1—1 of Figure 2.

Figure 2 is a sectional view on the line 2—2 of Figure 1 looking in the direction of the arrows.

Similar reference characters indicate corresponding parts throughout the several views in the drawings.

Referring to the drawings in detail, A designates generally a casing including a main circular body 10 and end heads or cheeks 11, respectively, these latter being bolted or otherwise made fast at 12 to the body 10. Located at diametrically opposite points with respect to the body 10 are fluid inlet nozzles 13, the fluid admission being controlled in any suitable manner.

Within the body 10 between the heads or cheeks 11 is a rotor involving spaced circular plates 17 and 18, respectively, the cheeks or heads 11 being formed in their inner faces with seats 19 for laterally offset peripheries 20 on the plates or discs 17 and 18 for accommodation therein. These plates or discs 17 and 18 are formed with hub portions 21 and 22, respectively, the latter accommodating a sleeve 23 while the hub portion 21 accommodates a shaft 24 which latter is received in the sleeve 23 and in packing glands 25 and 26, respectively, the latter fitting the sleeve 23 while the gland 25 fits the head or cheek 11 next thereto. The plate or disc 17 is keyed at 27 to the shaft 24 while the plate or disc 18 at its hub portion 22 accommodates a bushing 28 loosely embracing the sleeve 23.

Formed with the sleeve 23 between the plates or discs 17 and 18 are spaced cams 29 having the cam grooves 30 therein and said sleeve is maintained stationary by holding screws 31 fitting the cheek or head 11 next to said sleeve and engaged in the sleeve 23.

The body 10 is preferably made in two sections, these being interfitted at 31' and in this manner proper assembly of the parts of the motor may be had. At the lower portion of the body 10 are supporting legs 32, these resting upon a suitable foundation and elevating said body therefrom.

Between the plates or discs 17 and 18 is disposed a pivot ring 33 which has its outer periphery disposed a distance inwardly to the peripheries of the said plates or discs 17 and 18 and has provided therein hinge sockets 34 for pintle formations 35 of a series of blades or vanes 36 which are located uniformly spaced from each other peripherally with respect to the rotor and concentrically of the shaft 24 being of a width equal to the space between the discs 17 and 18. The pintle formations 35 at opposite ends thereof are journaled in pivot-sockets 37 provided in the plates or discs 17 and 18 and such sockets being close to the peripheries of the latter and are equipped with suitable bearing rollers 38 for the ends of said pintle formations. These plates or discs 17 and 18 are provided with clearances 39 for heel extensions 40 integral with the pintle formations 35 of the blades or vanes 36. The extensions are fitted with rollers 41 operating in the cam grooves 30 as created in the cams 29. The cam grooves 30 act upon the rollers 41 operating therein during the motion of the rotor to cause the proper setting of the blades or vanes for action of fluid and to have the same receive the full force of such fluid admitted to the body 10 through the inlet nozzles 13 which are in the form of injectors. These blades or vanes are maintained in confronting relation to the fluid admitted until the full force and effect has waned whence spent fluid will be discharged at the outlets 42, these being opposite the inlet nozzles 13 at diametrically opposite points of the body 10.

The ring 33 peripherally thereof has the seats 43 for the blades or vanes 36 on the inward swinging of the latter. Retarders or abutments 44 are formed interiorly of the body 10 between the points of intake and exhaust of fluid to and from the same. These retarders or abutments 44 avoid escapement of fluid under pressure past the blades or vanes and thus assure the proper exhaust or discharge of such fluid in the working of the motor, there being no chance of the unspent fluid admitted from one inlet nozzle 13 escaping full force and action upon the blades confronted thereby and exhausted unspent.

Fitted within the body 10 at the uppermost and lowermost points thereof are adjustable blocks 45, adjustment being had through screws 46 and such blocks coact with the outer tips of the blades and function to check the escape of unspent fluid from action upon the blades when such fluid is admitted through the inlet nozzle 13 to operate upon confronting blades or vanes of the rotor.

Interiorly of the body 10 in the inner circular wall thereof for a determined distance is provided a series of angled teeth 47, these being adapted for contact by the blades or vanes 36 at their tips and function to avoid seepage of fluid between the said blades at the tips thereof and the internal interior surface of the body 10.

The plates or discs 17 and 18 have at their peripheries sealing ribs 48, these being fitted in companion race ways 49 as provided in the body 10 to effect a fluid tight joint between the rotor and the said casing A.

The plates or discs 17 and 18 and the ring 33 are separably joined with each other through the medium of fasteners 49' and constitute together the rotor carrying the blades or vanes 36. To assemble the vanes 36 with the pintles 35 in the pivot ring, it may be necessary to have one of the arms 40 removable from each pintle 35 so that the latter can be passed into the opening therefor in the ring when the disks or plates 17 and 18 have been separated from the said ring or this ring may be divided up into a number of sections and such sections assembled with the pintles 35 of the vanes setting the latter to the pivot ring, being understood, of course, that during the assembly of the vanes with the ring either one or both of the plates or disks 17 and 18 are separated therefrom, which is had by removing the fasteners 49' which connect the said plates or disks and the ring together.

The blocks 45 will operate to eliminate back pressure of the fluid when actuating the rotor within the casing A of the motor while the retarders or abutments 44 in view of the angular disposition thereof effect abutments which also avoid back pressure of fluid admitted to the casing A. The teeth 47 which operate as cogs and the angularity thereof coinciding with the tips of the blades or vanes 36 in the travel of the rotor will cause a very exact adjustment of the said blades when rubbing the said teeth 47 under rotation of said rotor.

What is claimed is:

1. A motor of the kind described comprising a stationary casing forming a chamber, a rotary shaft journaled in the casing and centrally of said chamber, a hub fixed in the casing about the said shaft, spaced cams on the hub and each having a cam groove, rotatable disks fixed to the said shaft and within the chamber outwardly of the cam and having interfitting connections with the said casing at their sides and peripheries, a sectional pivot ring concentrically about the cams and separably fitted with the said disks, said pivot ring being of less diameter than the disks for the insetting of its outer periphery relative to the outer peripheries of the said disks and having pintle openings and vane seats intercommunicating with each other, vanes interfitting the casing and working within the said seats and having pintles fitting the pintle openings in said ring, the said pintles being journaled in the disks at opposite sides of the ring, double extensions formed with the pintles and having connection with the cam grooves in the said cams, a pair of inlet leads arranged at diametrically opposite points in said casing for communication with the chamber, a pair of exhaust leads communicating with the chamber and arranged diametrically opposite each other between the inlet leads, and retarders within the chamber for coaction with the vanes between the intake and exhaust leads.

2. A motor of the kind described comprising a stationary casing forming a chamber, a rotary shaft journaled in the casing and centrally of said chamber, a hub fixed in the casing about the said shaft, spaced cams on the hub and each having a cam groove, rotatable disks fixed to the said shaft and within the chamber outwardly of the cam and having interfitting connections with the said casing at their sides and peripheries, a sectional pivot ring concentrically about the cams and separably fitted with the said disks, said pivot ring being of less diameter than the disks for the insetting of its outer periphery relative to the outer peripheries of the said disks and having pintle openings and vane seats intercommunicating with each other, vanes interfitting the casing and working within the said seats and having pintles fitting the pintle openings in said ring, the said pintles being journaled in the disks at opposite sides of the ring, double extensions formed with the pintles and having connection with the cam grooves in the said cams, a pair of inlet leads arranged at diametrically opposite points in said casing for communication with the chamber, a pair of exhaust leads communicating with the chamber and arranged diametrically opposite each other between the inlet leads, retarders within the chamber for coaction with the vanes between the intake and exhaust leads, and adjustable blocks fitting the casing for contact with the vanes at their tips and cooperating for checking the escape of unspent fluid from activity upon the vanes at the points of admission of the said fluid into the chamber.

3. A motor of the kind described comprising a stationary casing forming a chamber, a rotary shaft journaled in the casing and centrally of said chamber, a hub fixed in the casing about the said shaft, spaced cams on the hub and each having a cam groove, rotatable disks fixed to the said shaft and within the chamber outwardly of the cam and having interfitting connections with the said casing at their sides and peripheries, a sectional pivot ring concentrically about the cams and separably fitted with the said disks, said pivot ring being of less diameter than the disks for the insetting of its outer periphery relative to the outer peripheries of the said disks and having pintle openings and vane seats intercommunicating with each other, vanes interfitting the casing and working within the said seats and having pintles fitting the pintle openings in said ring, the said pintles being journaled in the disks at opposite sides of the ring, double extensions formed with the pintles and having connection with the cam grooves in the said cams, a pair of inlet leads arranged at diametrically opposite points in said casing for communication with the chamber, a pair of exhaust leads communicating with the chamber and arranged diametrically opposite each other between the inlet leads, retarders within the chamber for coaction with the vanes between the intake and exhaust leads, and adjustable blocks fitting the casing for contact with the vanes at their tips and cooperating for checking the escape of unspent fluid from activity upon the vanes at the points of admission of the said fluid into the chamber, the said seats being constructed and arranged for accommodating the vanes to have the outermost portions thereof substantially flush with the outer periphery of the ring and escaping the retarders at determined points in the rotation of said ring.

FLORIANO PARREIRA.